United States Patent
Taylor et al.

[11] Patent Number: 5,991,528
[45] Date of Patent: Nov. 23, 1999

[54] EXPERT MANUFACTURING SYSTEM

[75] Inventors: Jay A. Taylor, Mesa, Ariz.; Dennis R. Swift, Concord; Gerard L. Zychowski, Parma, both of Ohio; Dennis R. Thompson, Taylors, S.C.; William A. Kramer, Dublin, Ohio

[73] Assignee: Reliance Electric Industrial Company, Cleveland, Ohio

[21] Appl. No.: 08/964,959

[22] Filed: Nov. 5, 1997

[51] Int. Cl.⁶ .................................................. G06F 19/00
[52] U.S. Cl. .............................. 395/500.27; 364/468.01
[58] Field of Search ........................ 364/468.03, 486; 395/500.27

[56] References Cited

U.S. PATENT DOCUMENTS 5,822,206  10/1998  Sebastian et al. .................. 364/468.03

Primary Examiner—Kevin J. Teska
Assistant Examiner—Lonnie A. Knox
Attorney, Agent, or Firm—John J. Horn; John M. Miller; William R. Walbrun

[57] ABSTRACT

An expert manufacturing system generates a manufacturing plan for producing a part in an automated manufacturing system. The expert manufacturing system generates a multipurpose manufacturing geometry definitions file. The expert manufacturing system includes a rule-based expert system which uses the manufacturing geometry definitions file to generate the manufacturing plan in the form of a neutral source code file. The neutral source code is converted to machine-specific program code directly executable by a device controller, such as a logic controller or motion controller. The expert manufacturing system also includes a parametric drawing generation program for generating drawing of the part, and a computer simulation program for simulating the manufacturing plan for producing the part.

21 Claims, 12 Drawing Sheets

FIG. 3A

MATCH TO FIG. 3B

MOTOR SHAFT XPFC     MATERIAL 46024-TB

| | DIAMETER 1 | LENGTH 1 | TOLERANCE 1 | DIAMETER 2 | LENGTH 2 | TOLERANCE 2 |
|---|---|---|---|---|---|---|
| PART NO. | A | B | C | D | E | F |
| 613310-01A | 0.625 | 0.98 | -0.004 | 0.639 | 1.66 | -0.0005 |
| 613310-01B | 0.625 | 0.98 | -0.004 | 0.639 | 1.66 | -0.0005 |
| 613310-01C | 0.625 | 0.98 | -0.004 | 0.639 | 1.66 | -0.0005 |

| DIAMETER 5 | LENGTH 5 | TOLERANCE 5 | DIAMETER 6 | LENGTH 6 | TOLERANCE 6 |
|---|---|---|---|---|---|
| M | N | O | P | Q | R |
| 0.987 | 9.418 | -0.0005 | 0.9848 | 0.66 | -0.0003 |
| 0.987 | 8.418 | -0.0005 | 0.9848 | 0.66 | -0.0003 |
| 0.987 | 7.918 | -0.0005 | 0.9848 | 0.66 | -0.0003 |

| KEYWAY 1 | Z-AXIS START POSITION | Z-AXIS END POSITION | DEPTH 1 | DEPTH TOLERANCE 1 | WIDTH 1 | WIDTH TOLERANCE 1 |
|---|---|---|---|---|---|---|
| | Z | AA | AB | AC | AD | AE |
| BODY 1 | 0 | 0.98 | 0.517 | -0.015 | 0.19 | -0.002 |
| BODY 1 | 0 | 0.98 | 0.517 | -0.015 | 0.19 | -0.002 |
| BODY 1 | 0 | 0.98 | 0.517 | -0.015 | 0.19 | -0.002 |

| FIRST GROOVE 1 | FIRST GROOVE START POSITION | FIRST GROOVE DIAMETER | FIRST GROOVE TOLERANCE | FIRST GROOVE WIDTH | FIRST GROOVE TOLERANCE | FIRST GROOVE RELIEF ANGLE |
|---|---|---|---|---|---|---|
| AM | AN | AO | AP | AQ | AR | AS |
| BODY 1 | 0.13 | 0.595 | -0.005 | 0.10 | -0.01 | 130 |
| BODY 1 | 0.13 | 0.595 | -0.005 | 0.10 | -0.01 | 130 |
| BODY 1 | 0.13 | 0.595 | -0.005 | 0.10 | -0.01 | 130 |

FIG. 3B

| DIAMETER 3 | LENGTH 3 | TOLERANCE 3 | DIAMETER 4 | LENGTH 4 | TOLERANCE 4 |
|---|---|---|---|---|---|
| G | H | I | J | K | L |
| 0.67 | 0.44 | -0.0004 | 0.787-TAPER | 0.62 | +0.01 |
| 0.67 | 0.44 | -0.0004 | 0.787-TAPER | 0.62 | +0.01 |
| 0.67 | 0.44 | -0.0004 | 0.787-TAPER | 0.62 | +0.01 |

| DIAMETER 7 | LENGTH 7 | TOLERANCE 7 | DIAMETER 8 | LENGTH 8 | TOLERANCE 8 |
|---|---|---|---|---|---|
| S | T | U | V | W | X |
| 0.9835 | 2.05 | -0.0005 | 0.625 | 1.475 | -0.0005 |
| 0.9835 | 2.05 | -0.0005 | 0.625 | 1.475 | -0.0005 |
| 0.9835 | 2.05 | -0.0005 | 0.625 | 1.475 | -0.0005 |

| KEYWAY 2 | Z-AXIS START POSITION | Z-AXIS END POSITION | DEPTH 2 | DEPTH TOLERANCE 2 | WIDTH 2 | WIDTH TOLERANCE 2 |
|---|---|---|---|---|---|---|
| AF | AG | AH | AI | AJ | AK | AL |
| BODY 8 | 16.687 | 15.317 | 0.517 | -0.015 | 0.19 | -0.002 |
| BODY 8 | 15.687 | 14.317 | 0.517 | -0.015 | 0.19 | -0.002 |
| BODY 8 | 15.187 | 13.817 | 0.517 | -0.015 | 0.19 | -0.002 |

| FIRST GROOVE RELIEF ANGLE TOLERANCE | SECOND GROOVE | SECOND GROOVE START POSITION 1 | SECOND GROOVE DIAMETER 1 | SECOND GROOVE TOLERANCE 1 | SECOND GROOVE WIDTH | SECOND GROOVE WIDTH |
|---|---|---|---|---|---|---|
| AT | AU | AV | AW | AX | AY | |
| +10 | BODY 6 | 12.498 | 0.926 | -0.004 | 0.091 | |
| +10 | BODY 6 | 11.498 | 0.926 | -0.004 | 0.091 | |
| +10 | BODY 6 | 10.998 | 0.926 | -0.004 | 0.091 | |

MATCH TO FIG. 3A

MATCH TO FIG. 3C

FIG. 3C

| SECOND GROOVE WIDTH TOLERANCE | CHAMFER 1 | CHAMFER 2 | FIRST BNG RELIEF | FIRST BNG SIZE |
|---|---|---|---|---|
| AZ | BA | BB | BC | BD |
| -0.005 | 0.03 X 90 | 0.09 X 30 | BODY 3 | 203 |
| -0.005 | 0.03 X 90 | 0.09 X 30 | BODY 3 | 203 |
| -0.005 | 0.03 X 90 | 0.09 X 30 | BODY 3 | 203 |

| SECOND BNG RELIEF | SECOND BNG SIZE | SHAFT OVERALL LENGTH | SHAFT OVERALL TOLERANCE |
|---|---|---|---|
| BE | BF | BG | BH |
| BODY 8 | 203 | 16.687 | -0.01 |
| BODY 8 | 203 | 15.687 | -0.01 |
| BODY 8 | 203 | 15.187 | -0.01 |

MATCH TO FIG. 3B

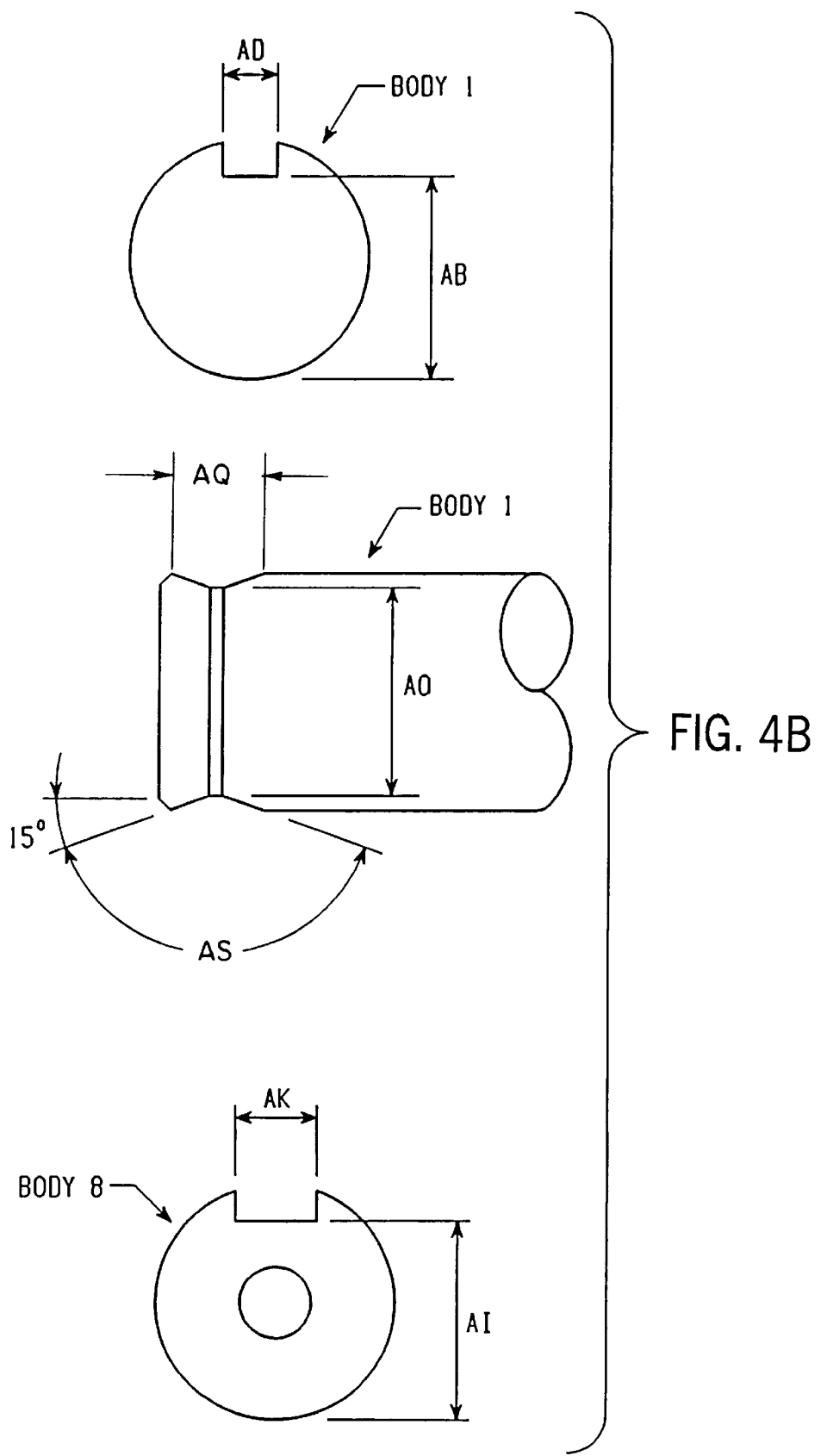

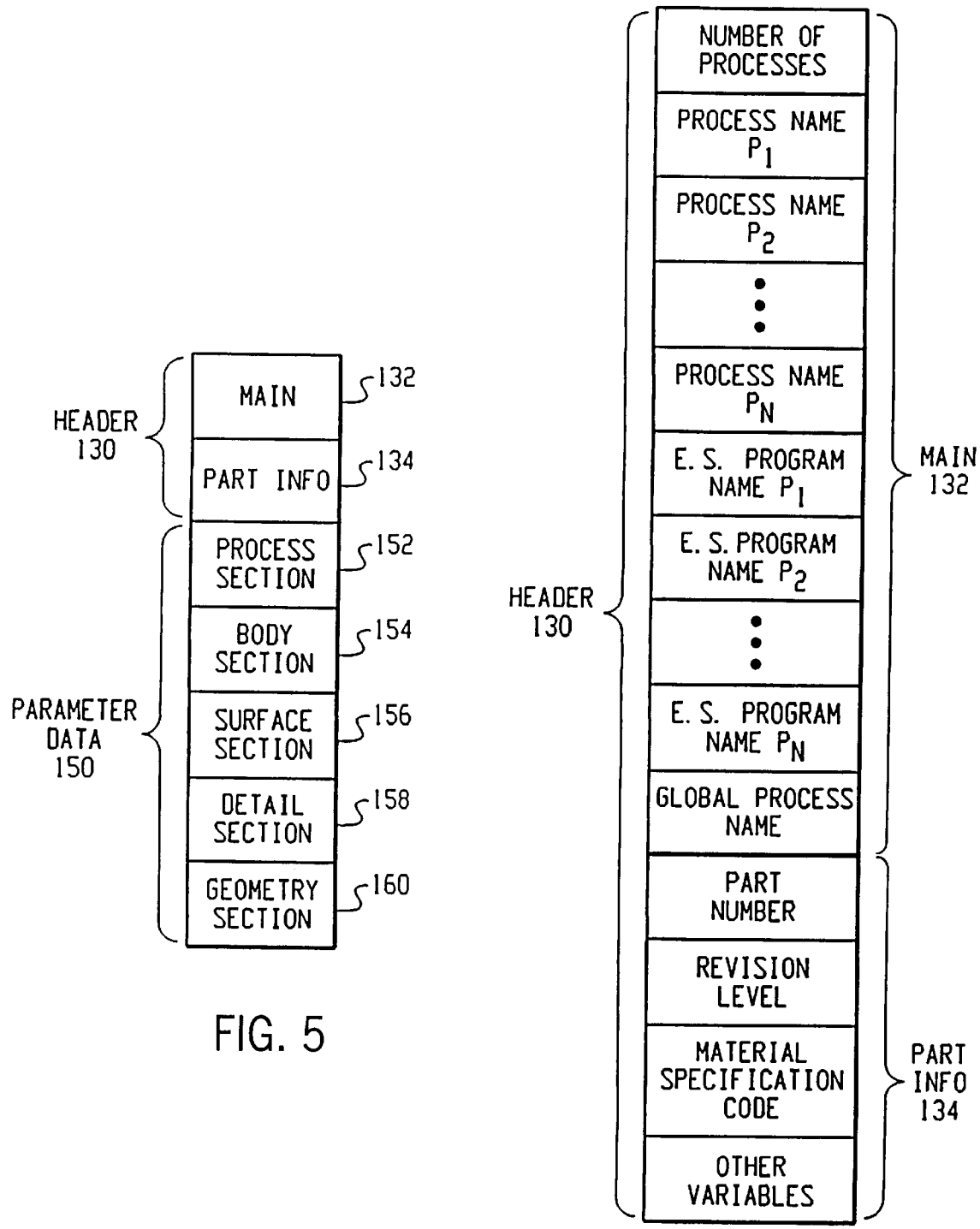

EXPERT MANUFACTURING SYSTEM

FIELD OF THE INVENTION

The present invention relates generally to a computer-controlled manufacturing system, and more particularly, to a computer-controlled manufacturing system that takes basic part data defining a part and generates a data file having sufficient information to produce high quality engineering drawings of the part, to generate program code to carry out a manufacturing process for producing the part, and to generate a computer simulation of the manufacturing process to verify and debug the manufacturing process.

BACKGROUND OF THE INVENTION

Today's highly competitive economy has led to short product design cycles for bringing innovative and improved products to market, the widespread implementation of just-in-time inventory, and a demand for high quality/low cost products. To remain competitive in this environment, manufacturers need tools which can make the manufacturing process more efficient and less costly.

At present, considerable time and effort is required to take basic part defining data and develop a "process plan" for manufacturing the part, including generating high quality engineering drawings of the part, generating program code executable by device controllers for manufacturing the part, and generating a computer simulation of the manufacturing processes for producing the part that will assist in verifying and debugging the processes.

"Process planning" refers to the activities necessary to translate basic part defining data into manufacturing operation details. The activities of a process plan include analysis of the basic part defining data, selection of a raw workpiece, determining manufacturing processes (e.g., machining operations) and their sequences, selection of machine tools and their associated operating tools (e.g., drills, cutters, etc.) for carrying out the processes on the workpiece, selection of work holding devices, selection of inspection equipment, and determining machining conditions (e.g., cutting speeds and feeds and depth of cut) and manufacturing times (e.g., set-up time, processing time, and lead time). It should be appreciated that the basic part defining data is defined to include geometric part features, dimensional data and tolerance specifications.

When developing a manufacturing plan for producing a part, the basic part defining data is analyzed by first performing an analysis of the geometric part features. Typical part features are planes, cylinders, cones, steps, edges and fillets. These common part features may be modified by the addition of detail elements such as grooves, key ways, threads, slots, pockets and holes, among others. Following part feature analysis, dimensional and tolerance analysis are performed to provide additional information for manufacturing purposes.

The manufacturing plan further requires selection of the raw workpiece, which involves defining such characteristics as shape, size (i.e., dimensions and weight) and material type. For instance, a raw workpiece may be in the shape of a rod, a slab or merely a rough forging. The dimensions, weight and the material type of the raw workpiece will be dictated by the physical and functional characteristics of the part to be manufactured.

Defining the manufacturing plan also involves determining the manufacturing processes (e.g., machining operations) and their sequences to transform the raw workpiece to a finished part having the desired part features, dimensions and tolerances. In many cases, there will be several ways to produce a part with a given design, and many factors, including the basic part defining data, influence the selection and sequence of the various manufacturing processes. For instance, a part requiring a hole with low tolerance and surface roughness specifications will require a simple drilling operation. In contrast, the same part with much finer surface finish and closer tolerance requirements will require first a drilling operation and then a boring operation to obtain the desired surface roughness and the tolerance on the hole feature of the part. Moreover, in some cases, manufacturing processes are dependent upon one another. In this respect, the holes may be required to be drilled before milling the inclined surface because the holes cannot be drilled accurately on an inclined surface. However, if the inclined surface has to be finished before drilling, an end mill will be needed to obtain a flat surface perpendicular to the axis of the drill before drilling the hole.

Machine tools also must be selected as part of defining a manufacturing plan. In selecting a machine tool, workpiece-related attributes, machine tool-related attributes and production volume must be considered. Workpiece-related attributes relate to the kinds of part features desired, the dimensions of the workpiece, its dimensional tolerance and the raw material form. Machine tool-related attributes relate to the process capability, mode of operation (e.g., manual, semi-automatic, automatic, numerically controlled), tooling capabilities (e.g., size and type of tool magazine) and automatic tool changing capabilities. Production volume-related information is directed to items such as the production quantity and purchase order frequency. Further the type and size of operating tool required to perform the various machining operations to generate each of the part features on the workpiece also must be determined.

Machining conditions associated with each machining operation and manufacturing times are determined to reduce costs and increase the production rate and also must be included in the manufacturing plan. A number of mathematical models for ascertaining the optimal machining conditions are known, including those directed to minimum cost per piece, maximum production rate models and manufacturing lead times.

A manufacturing plan must also specify work holding devices, such as clamps, jigs and fixtures, to locate and hold the workpiece. Finally, inspection equipment necessary to ensure the dimensional accuracy, tolerances and surface finish on the features also must be selected.

In addition to the complexities involved with process planning, complexities are also encountered in taking geometric part features, dimension data and tolerance specifications and generating high quality engineering drawings for a part and computer simulations of the manufacturing plan carried out to produce the part so that the manufacturing plan can be verified and debugged.

In view of the foregoing, there is a need to organize and process the data required to define a manufacturing plan for producing a part, to generate engineering drawings of the part, and to generate a computer simulation of the manufacturing plan. There is also a need to combine the foregoing functions into an integrated system so that data can be easily and efficiently transferred therebetween.

SUMMARY OF THE INVENTION

The present invention provides a system that automatically defines a manufacturing plan for producing the part.

The data that is derived while determining the manufacturing plan may also be used to generate high quality engineering drawings of the part and to produce a computer simulation that replicates the various manufacturing processes of the plan.

A first embodiment of the system for defining a manufacturing plan includes a part data file, a manufacturing file generator and an expert system. The part data file stores basic part defining data associated with the part selected for production. The part data file is used by the manufacturing file generator to generate a manufacturing file which includes manufacturing data. The expert system defines the manufacturing plan based on the contents of the manufacturing file.

According to one aspect of the invention, the part data file may comprise a plurality of data files, thus advantageously providing the manufacturing file generator with multiple sources of data.

In another aspect of the invention, the manufacturing file generator includes a set of predefined manufacturing rules which guide the derivation of the data in the manufacturing file.

In another embodiment of the invention, an expert manufacturing system for producing a part includes a part data file, a manufacturing file generator that generates a manufacturing file based on the part data file, an expert system, a program code generator, and device controllers which control various manufacturing devices. The expert system defines a manufacturing plan for producing the part based on data in the manufacturing file. The program code generator produces executable program code which corresponds to the manufacturing plan. The device controllers execute the program code and provide control signals to the manufacturing devices. The manufacturing devices then produce the part in accordance with the manufacturing plan.

In one aspect of this embodiment, the data in the manufacturing file identifies the various manufacturing processes to be carried out by the manufacturing devices to produce the part. The expert system includes a plurality of expert programs, each of which is configured to determine processing conditions associated with each of the manufacturing processes.

In another aspect of this embodiment, the expert manufacturing system further includes a manufacturing simulator which generates a simulation of the manufacturing plan. This feature advantageously assists in verifying and debugging the manufacturing plan.

In yet another aspect of this embodiment, the expert manufacturing system further includes a drawing generator that generates a part drawing based on the contents of the manufacturing file. This feature takes advantage of the efficient collection and manipulation of basic part data that is performed by the manufacturing file generator.

These and other advantages of the invention will become apparent from the detailed description given hereafter. It should be understood, however, that the detailed description and the specific embodiments are given by way of illustration only. Based on the following description, various changes and modifications within the spirit and scope of the invention will readily become apparent to those skilled in the art.

BRIEF DESCRIPTION OF THE DRAWINGS

The preferred exemplary embodiment of the invention will hereinafter be described in conjunction with the appended FIGURES, in which like reference numerals denote like elements, and wherein:

FIGS. 3A, 3B and 3C show a spreadsheet table providing basic part defining data for a set of parts having the same part type;

FIGS. 4A and 4B show a drawing of a part type from FIG. 3;

FIG. 5 shows the format of a manufacturing geometry definitions file (MGDF) generated by the expert manufacturing system;

FIGS. 6A and 6B show the sections of the header and parameter data portions of the MGDF.

DETAILED DESCRIPTION OF THE PREFERRED EMBODIMENT

Figure 1:
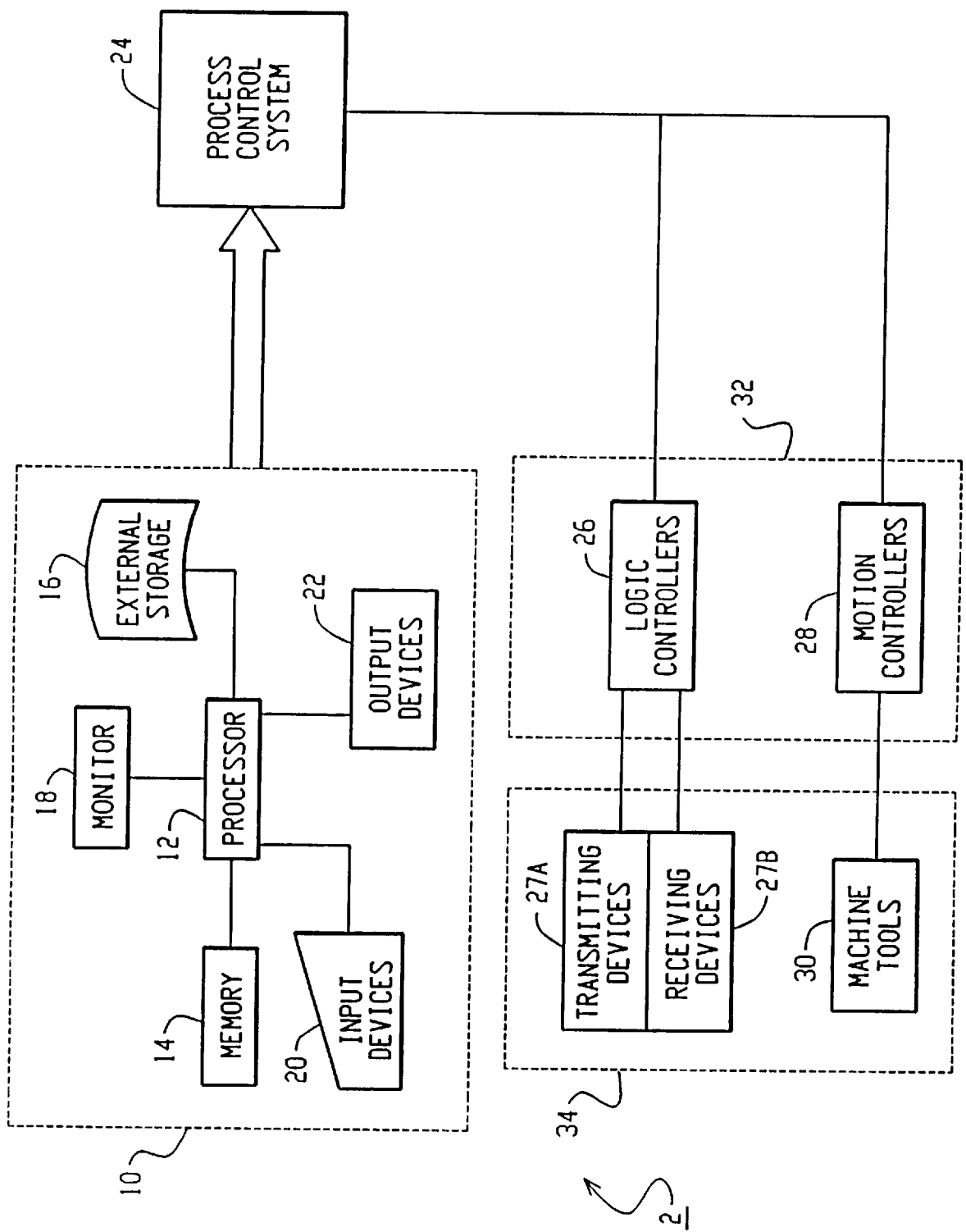
FIG. 1 is a block diagram representation of an automated manufacturing system according to a preferred embodiment of the present invention.

Referring now to the drawings, wherein the showing is for the purpose of illustrating a preferred embodiment of the invention only, and not for the purpose of limiting the same, FIG. 1 shows a block diagram of the hardware arrangement of an automated manufacturing system 2, according to a preferred embodiment of the present invention. Automated manufacturing system 2 is generally comprised of an expert manufacturing system 10, a process control system 24, device controllers 32, and manufacturing devices 34.

Expert manufacturing system 10 preferably takes the form of a Graphical User Interface based system including a processor 12, a memory 14, an external storage device 16, a monitor 18 and input devices 20. Processor 12 is preferably an Intel or Intel-compatible microprocessor; however, other microprocessors are also suitable. Memory 14 includes RAM and ROM for storing program code and data. External storage 16 may take the form of one or more high-capacity hard disk drives. Monitor 18 may take the form of a standard CRT or a touch screen monitor. Input devices 20 may include a keyboard, a keypad, a mouse, a trackball, a joystick, a digitizer, and the like. Expert manufacturing system 10 also includes output devices 22, which may include printers and plotters for generating high quality drawings and text. It should be appreciated that expert manufacturing system 10 may be configured as a network system having a client/server arrangement.

Process control system 24 provides general process control. In this respect, process control system 24 controls multiple manufacturing processes. More specifically, process control system 24 monitors, controls and coordinates the operation of the various types of physical equipment (e.g., machine tools) on the shop floor in a concurrent manner. Importantly, process control system 24 can simultaneously control several processes or machines. In general, process control system 24 plays a supervisory role, monitoring the operations of manufacturing devices 34, archiving control programs (e.g., ladder logic programs and NC/CNC programs), and downloading the appropriate control programs to device controllers 32 as needed. Process control system 24 preferably takes the form of RCIMS ("Reliance Computer Integrated Manufacturing System") available from Reliance Electric Company.

Device controllers 32 include logic controllers 26 and motion controllers 28. Logic controllers 26 may include PLCs ("Programmable Logic Controllers") and/or IPCs ("Industrial Program Controllers"). The motion controllers 28 are typically machine control units (MCUs), which generate machine tool commands.

Manufacturing devices 34 are typically transmitting devices 27A and receiving devices 27B, which both interface with logic controllers 26, and machine tools 30 which interface with motion controllers 28. The transmitting devices 27A may include sensors, switches and machine outputs, while the receiving devices 27B may include actuators, lamps, relays, motor controllers, solenoid valves and machine inputs. Machine tools 30 respond to machine tool commands generated by motion controllers 28. Machine tools 30 may include milling machines, lathes, drill presses, horizontal machining centers, vertical machining centers, and the like.

It should be appreciated that the foregoing hardware components have been described in general terms only, since they are well known to those of ordinary skill in the art.

Figure 2:
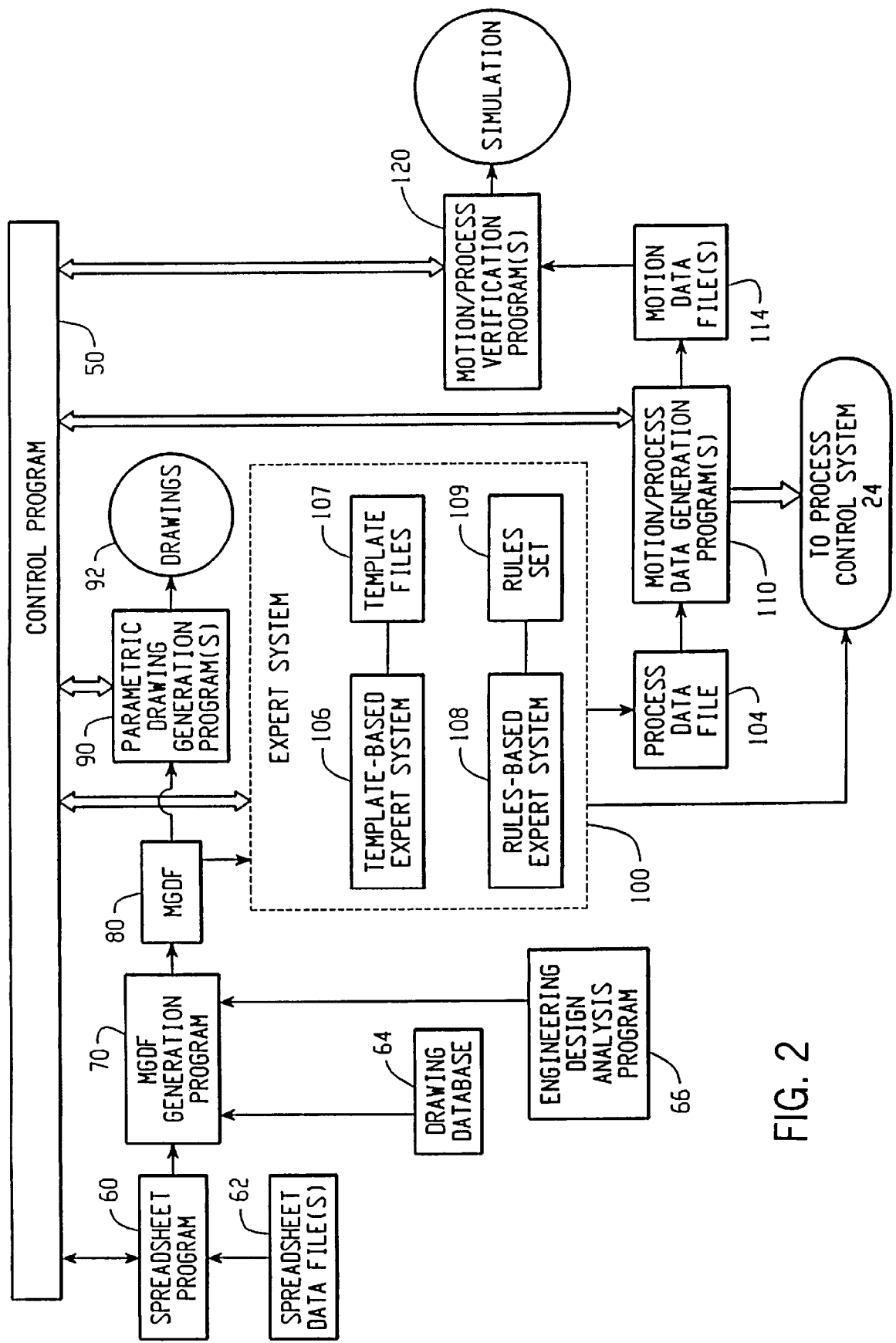
FIG. 2 is a data flow diagram of an expert manufacturing system according to a preferred embodiment of the invention.

A general overview of the system operation for expert manufacturing system 10 will now be provided with reference to FIG. 2. Expert manufacturing system 10 is generally comprised of a control program 50 and a plurality of program modules including a spreadsheet program 60, manufacturing geometry definitions file (MGDF) generation program 70, parametric drawing generation programs 90, an expert system 100, motion/process data generation programs 110 and motion/process data verification programs 120.

The primary function of control program 50 is to provide a user interface to expert manufacturing system 10 and overall control of the various program modules of expert manufacturing system 10. In this respect, control program 50 provides a graphical user interface (GUI) for the input of information by the system operator. The GUI may be in the form of a "Windows" interface having pull-down menus, buttons and text boxes for entering information. Control program 50 invokes the appropriate program modules based upon the information entered by the system operator using the GUI.

Spreadsheet program 60 may be standard, commercially available spreadsheet software, such as Microsoft® EXCEL or Lotus® 1-2-3. Spreadsheet program 60 includes one or more associated spreadsheet data files 62. Each spreadsheet data file 62 contains dimension data, tolerance specifications and other basic part defining data for one or more "parts," each of which preferably has a unique identifier, such as, a part number or a catalog number. It should be appreciated that the term "part" is used herein to refer to an item that may be manufactured using automated manufacturing system 2. Moreover, each spreadsheet data file 62 may provide basic part defining data for a different type of part. The contents of spreadsheet data files 62 will be described in greater detail below.

It should be appreciated that while a preferred embodiment of the present invention will be described with reference to a spreadsheet program and spreadsheet data files, other programs are suitable for storing basic part defining data. For instance, the AutoDesk AutoCAD program could be used. Accordingly, the dimension data, tolerance specifications and other basic part defining data may be stored in formats such as DXF (Drawing Exchange File) format, IGES (Initial Graphics Exchange Specification) format, or PDES (Product Data Exchange Standard).

Referring now to FIGS. 3A, 3B and 3C, there is shown a spreadsheet data file 62 containing several sets of dimension data, tolerance specifications and other basic part defining data for a shaft. Each row of information corresponds to a different part number. Each part number refers to a shaft having different basic part defining data.

Spreadsheet program 60 accesses an appropriate spreadsheet data file 62 based upon an operator-selected "part type." For each part type there may be a plurality of parts, each part having different dimensions, tolerances, etc. The operator will select a specific part from the list by, for instance, entering a part number or highlighting the row of data corresponding to the desired part. As a result, spreadsheet program 60 will retrieve basic part defining data from spreadsheet data file 62 corresponding to the selected part, trigger MGDF generation program 70, and send the data from file 62 to program 70.

Figure 4A:
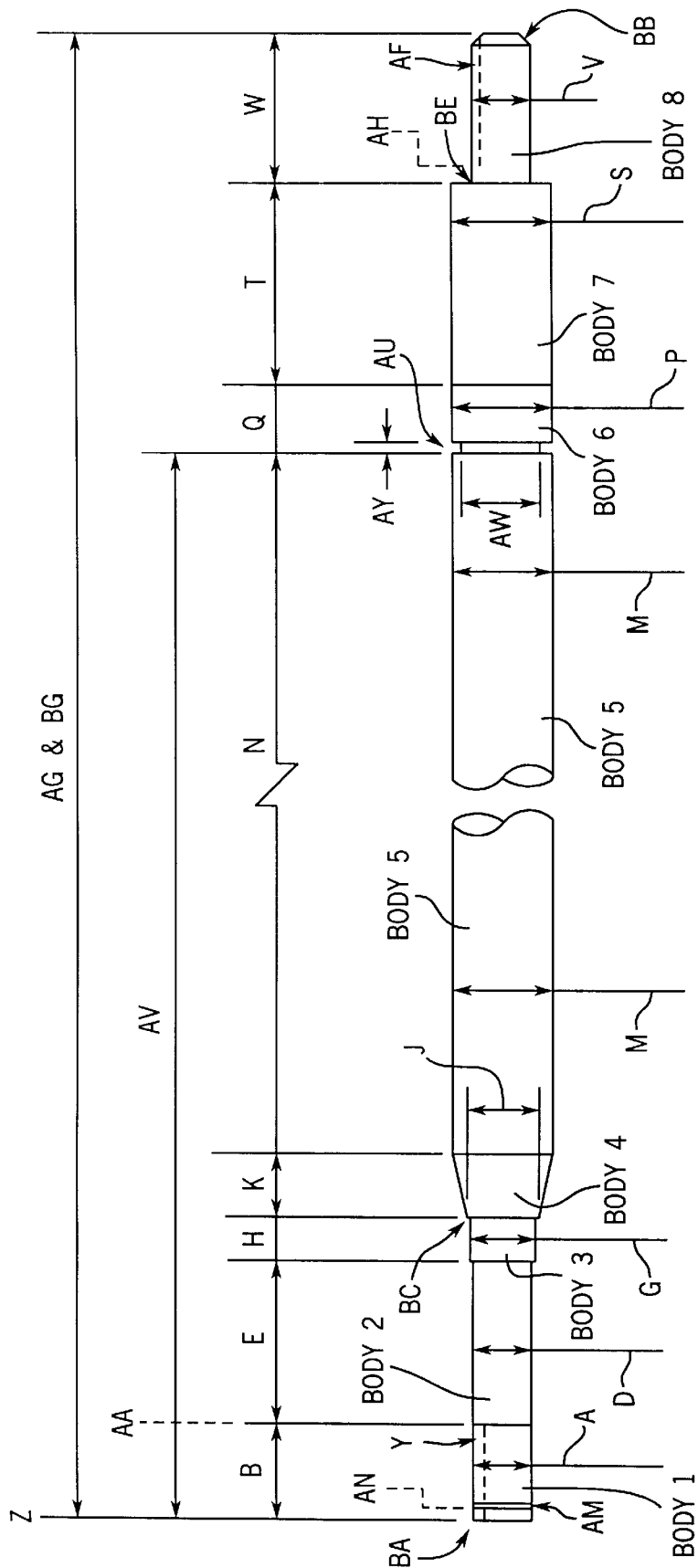

Based on the selected part, MGDF generation program 70 may retrieve necessary additional basic part defining data from other sources, such as drawing database 64 and engineering design analysis program 66. Drawing database 64 includes information, such as casting drawings, finish drawings, product drawings, etc., which provide part defining data such as material specifications, finish and surface requirements, part revision information, etc. For example, a representative drawing of a shaft which may be stored in drawing database 64 is shown in FIGS. 4A and 4B. It should be appreciated that the dimensions, tolerances and other basic part defining data listed in FIGS. 3A–C refer to the labels in FIGS. 4A and 4B.

Engineering design analysis program 66 with associated files is another source of basic part defining data for MGDF generation program 70 which may provide, for instance, dimensional tolerance information for the various parts. MGDF generation program 70 may also access other basic part data which may be stored in data tables within program 70, or may derive additional basic part data from the accessed or stored data by using extrapolation, interpolation, etc. MGDF generation program 70 uses the foregoing part requirement information to derive manufacturing data associated with the part. The data is stored in a manufacturing geometry definitions file (MGDF) 80 in, for instance, a neutral file format, such as ASCII.

Program 70 may include decision tables or predefined expert rules set, which have been input by a manufacturing engineer, to guide the decision-making process involved in deriving the manufacturing data. For instance, the decision tables and/or rule sets may direct program 70 to the various sources (e.g., drawing database 64, engineering design analysis program 66, etc.) which contain required basic part defining data. Further, the decision tables and/or rule sets may specify that a particular machining operation (e.g., turning, milling, grinding, boring, knurling, etc.) must be used to generate a particular part feature, or that a particular expert program included in expert system 100 be invoked to provide machining conditions (e.g., feed rate, cutting speed, etc.) associated with a particular machining operation. Still further, the decision tables and/or rule sets may dictate that a particular type and size of machine tool be used based on the part features and on the capability of the manufacturing location at which the part will be produced. The decision tables and rule sets may be generated by programming techniques known in the art. The content of the decision tables and rule sets will vary depending on the capabilities of the manufacturing location and the types of parts the expert manufacturing system is designed to produce.

Accordingly, in general, the manufacturing data contained in MGDF 80 includes the combination of all basic part defining data, regardless of the source or whether derived by program 70, as well as other details related to the manufacture of the part. Thus, the manufacturing data may include data specifying part features, such as body elements, detail elements formed on body elements, surface elements formed on body elements and primitive geometry elements, each of which will be explained below. The manufacturing data may also include a general specification of manufacturing processes for producing the various part features (e.g., milling, turning, grinding, boring, etc.), as well as other information related to the manufacturing processes as will be illustrated in an example below.

The manufacturing data in MGDF 80 thus is sufficient to produce engineering drawings of the part, for expert system 100 to generate a manufacturing plan in the form of a process data file 104 having information for producing program code for device controllers 32, and for producing a computer simulation of the manufacturing plan for manufacturing the part.

Parametric drawing generation programs 90 may use MGDF 80 to generate a script file or drawing file for producing the engineering drawing. In this respect, the neutral format MGDF 80 is converted to a script file or drawing file compatible with the parametric drawing generation programs 90. Once the appropriate script file or drawing file has been generated, high quality engineering drawings 92 of the selected part can be produced using output device 22. Parametric drawing generation programs 90 will typically take the form of a commercial CAD drawing program, such as AutoCAD (ACAD) from Autodesk®, Visual CADD from COREL®, or the like. It should be appreciated that parametric drawing generation programs 90 will be invoked only if the operator has requested control program 50, via the GUI, to generate engineering drawings of the part.

Expert system 100 is an expert system which stores knowledge of a particular domain and uses that knowledge to solve problems from that domain in an intelligent way. More particularly, expert system 100 provides a knowledge-based process planning system which uses a computer to simulate the decision process of a human expert. In this respect, expert system 100 carries out "computer-aided process planning" or CAPP. Typical expert CAPP systems include XPLAN, MIPLAN and TURBO-CAPP, which are commercially available. The primary purpose of CAPP is to translate design requirements (e.g., part features, dimensions and tolerance specifications, etc.) into manufacturing process details, such as details needed to perform turning, drilling, milling and grinding operations. In the context of an expert system for developing manufacturing plans for a variety of parts, the expert system will include a knowledge base of information about the parts, such as their geometry, the equipment needed to manufacture the parts and the details of the various manufacturing processes, including machining conditions (e.g., feed rate or cutting speed), operation sequences, operating tool selection, fixture selection, etc. This information typically is initially provided by a manufacturing engineer, but may also be learned through observation by the expert system.

Referring to FIG. 2, expert system 100 preferably is comprised of a template-based expert system 106 and/or a rules-based expert system 108. Systems 106 and 108 are comprised of a plurality of expert manufacturing programs which generate device controller program code in the form of a neutral source code. Template-based expert system 106 stores its knowledge of manufacturing processes in template files 107, which are callable macros. In addition, template files 107 may also include a process template which contains the geometry, or other data, for manufacturing the part. Rules-based expert system 108 stores its knowledge of manufacturing processes in the form of a rules set 109. The expert manufacturing programs use the information provided by MGDF 80 to template files 107 and rules set 109 to determine a manufacturing plan, including details of each of the manufacturing processes for producing the selected part, such as machining conditions and operation sequences, and to generate the neutral source code programs corresponding to the manufacturing plan. It should be appreciated that the neutral source code is comprised of a series of operating instructions in a high level programming language, suitable for conversion to a low level programming language directly executable by device controllers 32. The neutral source code is stored in process data file 104.

Motion/process data generation programs 110 convert the neutral source code stored in process data file 104 to program code directly executable by specific device controllers 32. The conversion procedure is well known to those skilled in the art. The executable program code is sent to process control system 24, which in turn sends the program code to the appropriate device controller. The program code may also be stored in motion data files 114, as will be explained below. A different motion/process data generation program is executed to generate each type of program code. In this respect, each device controller may respond to a different programming language or different form of the same programming language. For instance, the neutral source code may be converted to NC/CNC motion data, ladder logic, process control data, setup data, or manufacturing standards data. The program code is supplied to process control system 24. It should be appreciated that expert system 100 may also directly generate the directly executable program code and supply it to process control system 24.

As indicated above, the executable program code may also be stored in motion data files 114. This will occur if the operator has instructed control program 50 via the GUI to generate a computer simulation of the manufacturing processes for manufacturing the part. Each motion data file 114 contains the executable program code for a different device controller.

Motion/process verification programs 120 retrieve data from motion data files 114. Each motion/process verification program 120 reads data from a different motion data file 114, since each motion/process verification program generates graphical data relating to a different device controller. The graphical data is displayed on monitor 18 to provide a computer simulation of the manufacturing processes included in the manufacturing plan. The computer simulation provides a graphical model of a process or production operation, which allows for verification and debugging of the manufacturing process. The computer simulation is performed in a manner well known to those skilled in the art.

Figure 6B:
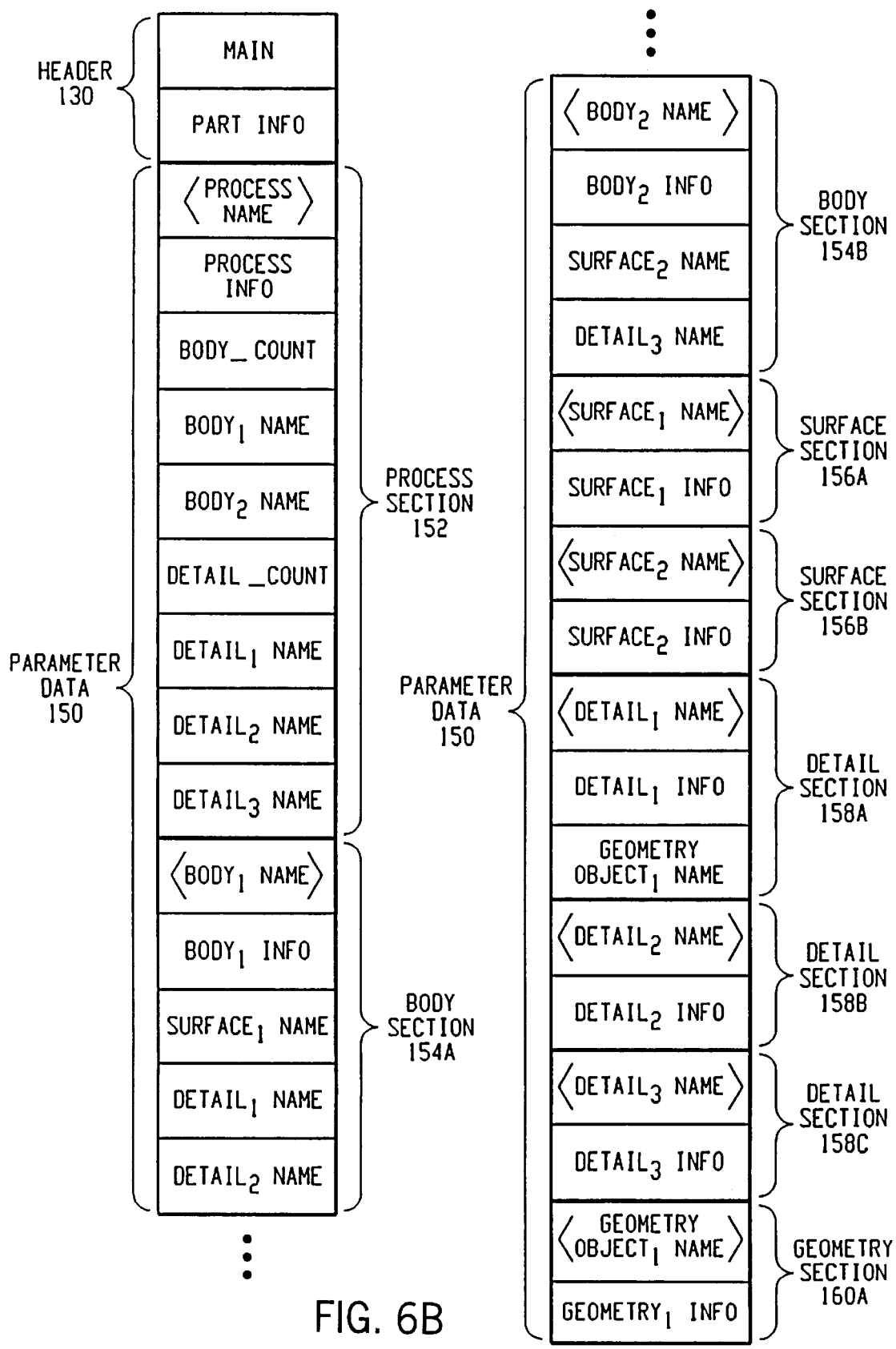

The structure of MGDF 80 will now be described with reference to FIGS. 5, 6A and 6B. MGDF 80 is comprised of a header portion 130 and a parameter data portion 150. Header portion 130 is comprised of a main section 132 and a part info section 134. Parameter data portion 150 includes a process section 152, body section 154, surface section 156, detail section 158, and geometry section 160. These sections will be described in detail below.

Header section 130 will now be described in detail with reference to FIG. 6A. Main section 132 is comprised of a plurality of fields which provide the number of processes, the names of processes, and the names of expert system programs. More specifically, these fields consist of a "Number of Processes" field, "Process Name" fields P1–PN, "Expert System Program Name" fields P1–PN and a "Global Process Name" field. The "Number of Processes" field provides the number of processes that are defined in the particular MGDF. Each Process Name refers to a process for producing a part feature. Examples of typical processes are turning, boring, milling, drilling, reaming and grinding. Accordingly, the process names in the Process Name fields may be "TURN," "MILL" and "GRIND."

The "Expert System Program Name" fields provide the name of expert manufacturing programs to be invoked in expert system 100. Each named manufacturing process is associated with a different named expert manufacturing program, since a different program may be invoked for each named manufacturing process.

The "Global Process Name" field provides a name for the overall manufacturing process. For instance, the global process name could be "XSHAFT," indicating that all of the named manufacturing processes carry out a manufacturing plan for producing a shaft. In other words, the global process name provides a single name for the collection of Process Names P1–PN.

Turning now to the part info section 134, this section is comprised of a "Part Number" field, a "Revision Level" field, a "Material Specification Code" field, and "Other Variable" fields. The "Part Number" field provides the part number identified in the spreadsheet program corresponding to the part selected to be manufactured. The "Revision Level" field includes the revision level for the corresponding part. The "Material Specification Code" field provides the material specifications for producing the desired part. The part number, revision level and material specification code may originate from drawing database 64. The "Other Variables" field provides other variables needed by process control system 24 to properly catalog the part to be manufactured. For instance, the "Other Variables" may identify which expert manufacturing program of expert system 100 will be used to create the data which results in the program code to be received by process control system 24.

Parameter data portion 150 will now be described in detail with reference to FIG. 6B. As discussed above, parameter data portion 150 includes a process section 152, a body section 154, a surface section 156, a detail section 158, and a geometry section 160. Process section 152 includes a "Process Name" field, a "Process Info" field, a "Body Count" field, one or more "Body Name" fields, a "Detail Count" field, and one or more "Detail Name" fields. The "Process Name" field stores the name of the individual process (e.g., "TURN," "MILL" or "GRIND"). The "Process Info" field is actually multiple fields which store process information, such as the name of the expert manufacturing program for this process in expert system 100, the type of environment (e.g., Windows, DOS, ACAD, etc.) in which the expert manufacturing program runs, the name of the motion/process verification program which is executed to simulate the named process, the program name links to other programs to be executed for the computer simulation, and an assigned operation number for the named process.

The "Body Count" field stores the number of body elements making up the part. In this respect, each part is comprised of one or more body elements. Examples of body elements include blocks, cubes, cylinders, cones, spheres, wedges, and toruses. The "Body Name" fields store a name for each body element.

The "Detail Count" field stores the number of detail elements formed on the body elements. In this respect, each body element may have one or more detail elements. Examples of detail elements include grooves, threads, slots, pockets and holes. The "Detail Name" fields store a name for each detail.

Body section 154A includes a "Body$_1$ Name" field, a "Body$_1$ Info" field, a "Surface$_1$ Name" field, a "Detail$_1$ Name" field and a "Detail$_2$ Name" field. The "Body$_1$ Name" field identifies the body$_1$ element associated with body section 154A. "Body Info" field is actually a plurality of fields storing various types of information related to body$_1$. For instance, the "Body, Info" fields may store the length of body$_1$, the diameter of the start of body$_1$, a taper angle, the radius of an arc to be drawn at the hip of body$_1$, and the radius of an arc to be drawn at the knee of body$_1$.

The "Surface Name" field identifies a surface section in parameter data 150 storing information regarding the type of surface elements to be applied to body$_1$. Examples of surface elements are roughness, etc. Surface sections 156A, 156B will be described below.

The "Detail$_1$ Name" field and "Detail$_2$ Name" field identify detail sections in parameter data 150 storing information regarding the type of detail element formed on body$_1$. Detail sections 158A–158C will be described below.

Body section 154B includes fields similar to body section 154A. However, body section 154B relates to a different body element of the part than body section 154A.

Surface section 156A includes a "Surface$_1$ Name" field and a "Surface$_1$ Info" field. The "Surface$_1$ Name" field identifies the surface section. "Surface$_1$ Info" field is a plurality of fields storing surface element information, such as the amount of grind stock to leave, feed rate to achieve a desired surface roughness, radius value to use at a turn/face intersection, and undercut to introduce at a turn/face intersection. Surface section 156B provides similar surface element information for a surface element associated with body section 154B.

Detail section 158A includes a "Detail$_1$ Name" field, a "Detail$_1$ Info" field, and a "Geometry Object$_1$ Name" field. The "Detail$_1$ Name" field identifies the detail$_1$ element associated with detail section 158A. The "Detail$_1$ Info" field is a plurality of fields which store various types of information related to detail$_1$. For instance, "Detail$_1$ Info" fields may store a name identifying the type of detail (e.g., groove, thread or key way), the start position on the body element for the detail element, the end position on the body element for the detail element, a depth for the detail element, a length for the detail element, etc. The "Geometry Object$_1$ Name" field stores an identifier for geometry section 160A. Geometry section 160A will be described below. Detail sections 158B and 158C provide similar information for different detail elements.

Geometry section 160A includes a "Geometry Object$_1$ Name" field and a "Geometry$_1$ Info" field. "Geometry Object$_1$ Name" field identifies the geometry element associated with geometry section 160A. Geometry elements are geometry primitives, such as points, lines, arcs, circles, ellipses, parabolas and hyperbolas. "Geometry$_1$ Info" field is one or more fields for storing information relating to the geometry elements. For instance, "Geometry$_1$ Info" fields may store data identifying the type of geometry element, points defining a line or arc, and the number of points making up the associated body element.

Referring now to FIGS. 7–12, there is provided a general description of a parameter data portion 170 of an MGDF for a shaft. It should be appreciated that the manufacturing plan for a shaft includes the steps of turning, milling and grinding. Turning is a machining operation wherein a workpiece is held in a spindle and rotated about the longitudinal axis while a cutting tool is fed into the rotating workpiece to remove material and produce the desired shape. In a turning operation, the material can be removed from either the external surface (OD) of the workpiece or from the internal part (ID) of the material in the spindle. The OD operations include facing, chamfering, grooving, knurling, skiving, threading and cut-off (parting). The ID operations include recessing, drilling, reaming, boring and threading.

Milling is a machining operation that removes material using a rotating cutter with multiple cutting edges. Cutting is achieved by feeding the workpiece into a stationary rotating cutter, feeding a rotating cutter into a stationary workpiece, or a combination of both. Most milling machines are grouped into two categories, namely, horizontal and vertical.

Grinding is a machining operation wherein material is removed by means of an abrasive grain. The grinding operation produces smoother surface finishes than those achieved through turning or milling. Accordingly, grinding is frequently the last operation in a production sequence.

Figures 7, 8:
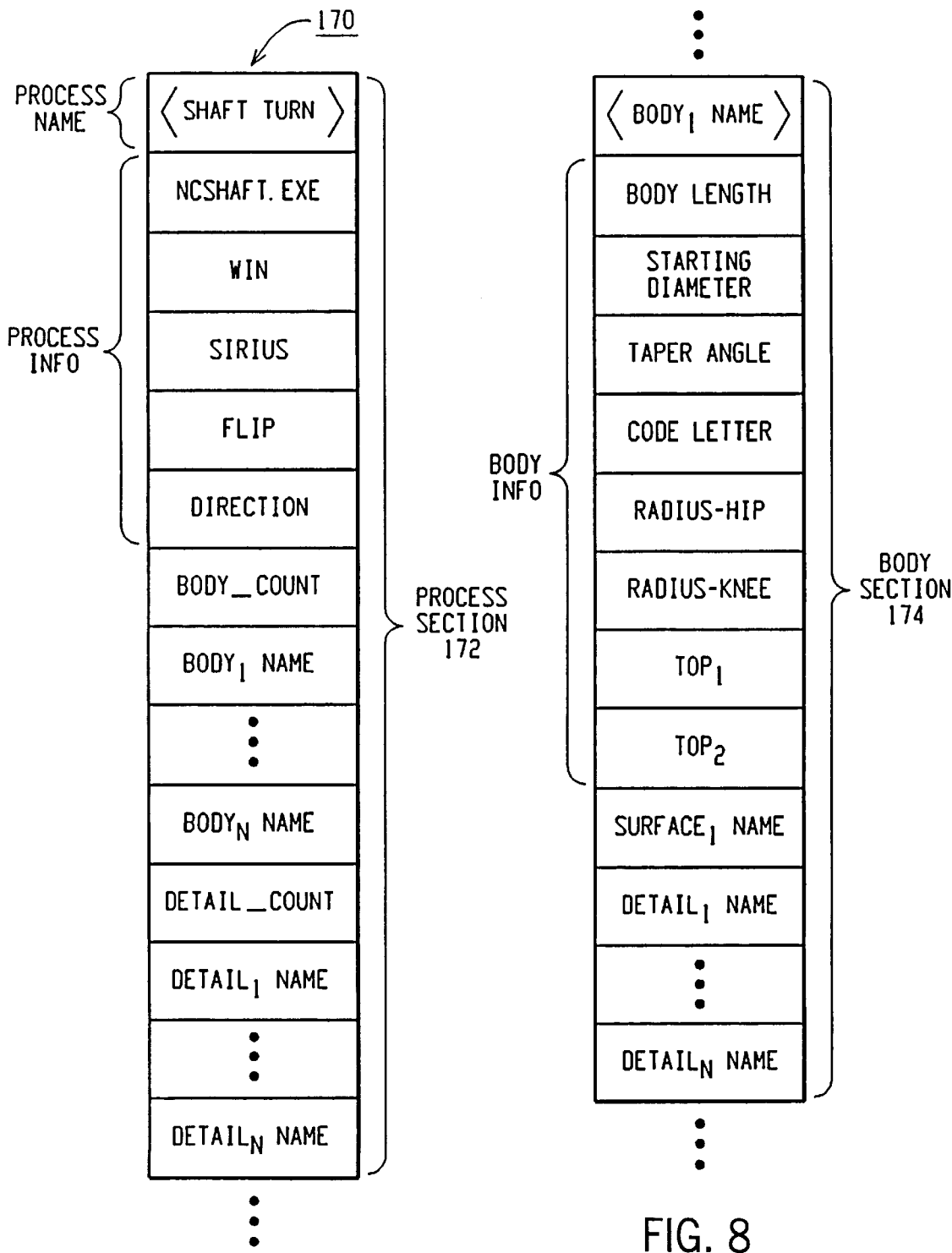
FIGS. 7–12 shows the parameter data portion of an MGDF for manufacturing a shaft.

Turning first to FIG. 7, there is shown a process section 172 for a shaft. The process name field contains the name "SHAFT TURN." The process info section has fields containing an expert system program name "NC SHAFT," an expert system environment identifier (program name) "WIN," which refers to the Windows operating system, a verification routine identifier (program name) "SIRIUS," which refers to a motion/process verification program, a process operation "FLIP," which refers to the method by which the shaft will be manufactured, and a field containing "DIRECTION," which refers to either left-to-right or right-to-left. This describes the order of definition in the file for the shaft bodies. Process section 172 also includes a Body Count field, a plurality of Body Name fields, a Detail Count field, and a plurality of Detail Name fields. Each detail is associated with a body. In this respect, Detail$_1$ refers to a detail of body$_1$.

FIG. 8 shows body section 174 for body$_1$. Body section 174 includes the body info for body$_1$, including "Body Length," which refers to the length of body$_1$; "Starting Diameter," which refers to the diameter at the start of body$_1$; "Taper Angle," which refers to the taper angle off the center line; "Code Letter," which refers to a proprietary specification for altered machining (e.g., inclusion of grinding stock); "Radius-Hip," which refers to the radius for an arc to be drawn at the hip of body$_1$; "Radius-Knee," which refers to the radius or chamfer for an arc to be drawn at the knee of body$_1$; "Top 1," which refers to the radius or chamfer to be applied at the start of the upper diameter of body$_1$; and "Top 2," which refers to the radius or chamfer to be applied at the end of the upper diameter of body$_1$. Surface$_1$ Name refers to the surfacing type to be applied. Accordingly, Surface$_1$ Name links to surface section 176, Details$_1$ Name through Detail$_N$ Name link to detail section 178 defining a detail element of body$_1$.

Figure 9:
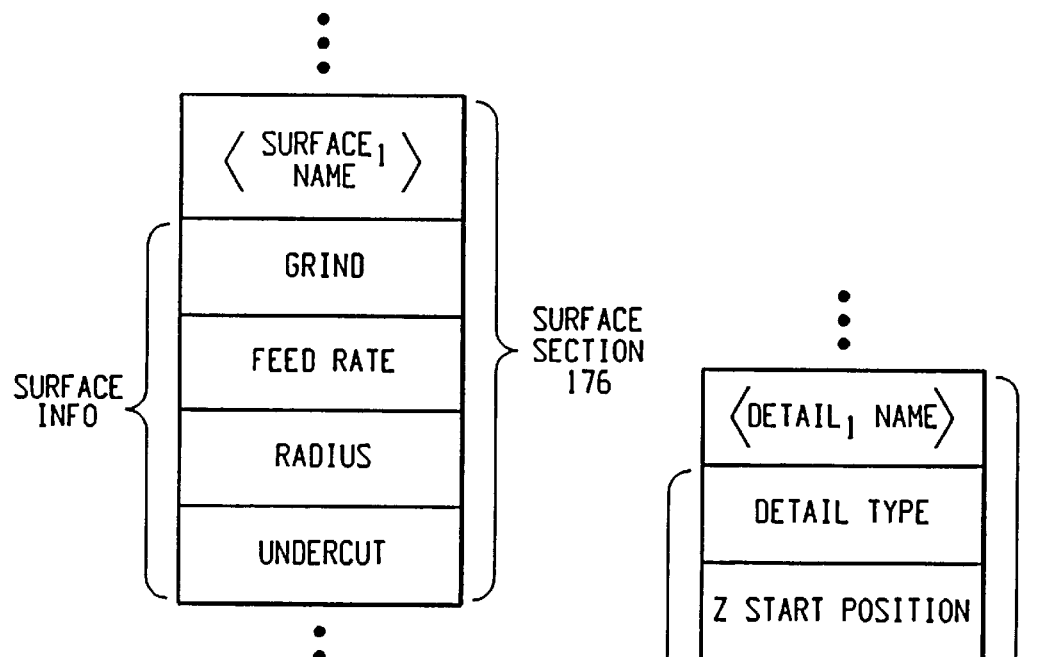

Turning now to surface section 176 shown in FIG. 9, this section provides information associated with Surface$_1$ Name. In this regard, surface section 176 stores surface information for Surface$_1$ Name, including "Grind," which refers to the optional amount of grind stock to leave; "Feed Rate," which refers to the optional feed rate to use to achieve a desired surface roughness; "Radius," which refers to the optional radius value to use at a turn/face intersection; and "Undercut," which refers to an optional undercut to introduce at a turn/face intersection.

Figure 10:
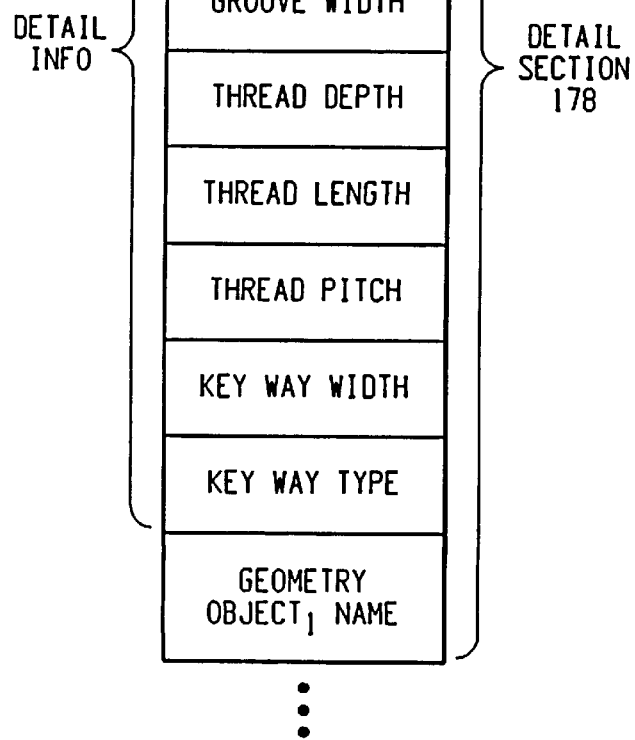

Turning now to detail section 178 shown in FIG. 10, this section provides information associated with Detail$_1$ Name. In this regard, detail section 176 stores information for Detail$_1$ Name, including "Detail Type," which refers to the type of detail (e.g., groove, thread, key way); "Z Start Position," which refers to the start position along a Z center line as measured from the right edge of the shaft; "Z End Position," which refers to the ending position along the Z center line as measured from the right edge of the shaft; "Groove Depth," which refers to the depth of a groove; "Groove Width," which refers to the width of a groove; "Thread Depth," which refers to the depth of a thread; "Thread Length," which refers to the length of a thread; "Thread Pitch," which refers to the pitch of a thread; "Key Way Width," which refers to the width of a cut; and "Key Way Type," which refers to the type of key way.

Figure 11:
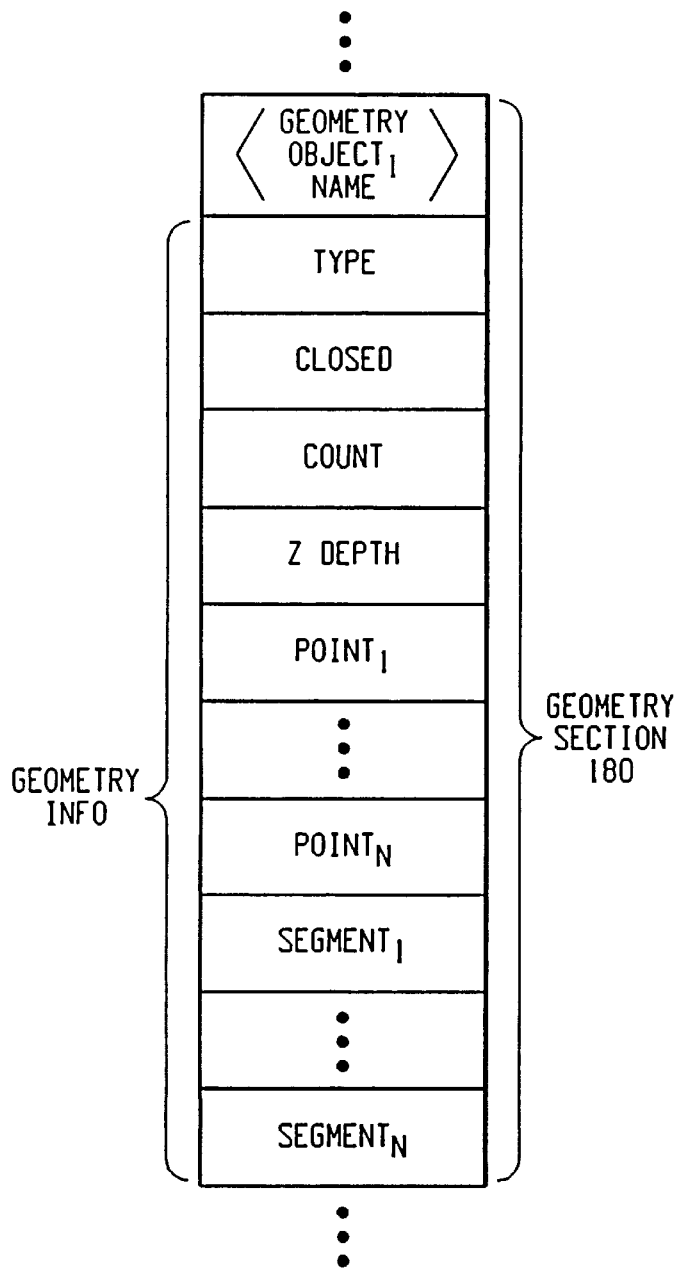

Referring now to FIG. 11, there is shown a geometry section 180 providing geometry info associated with Geometry Objects$_1$ Name. The geometry info includes geometry element information including "Type," which refers to either points or segments; "Closed," which refers to whether the key way is closed or open ended; "Count," which refers to the number of points or segments making up an object or body; "Z Depth," which refers to a fixed Z depth for all segments or points. "Point$_1$" through "Point$_N$," which refer to the points making up the key way in an XYZ format; "Segments" through "Segments N," which refer to the segments making up the key way. Segments are in the form of either lines or arcs. Both points and segments are numerical data which may be derived from or received directly from spreadsheet program 60.

Figure 12:
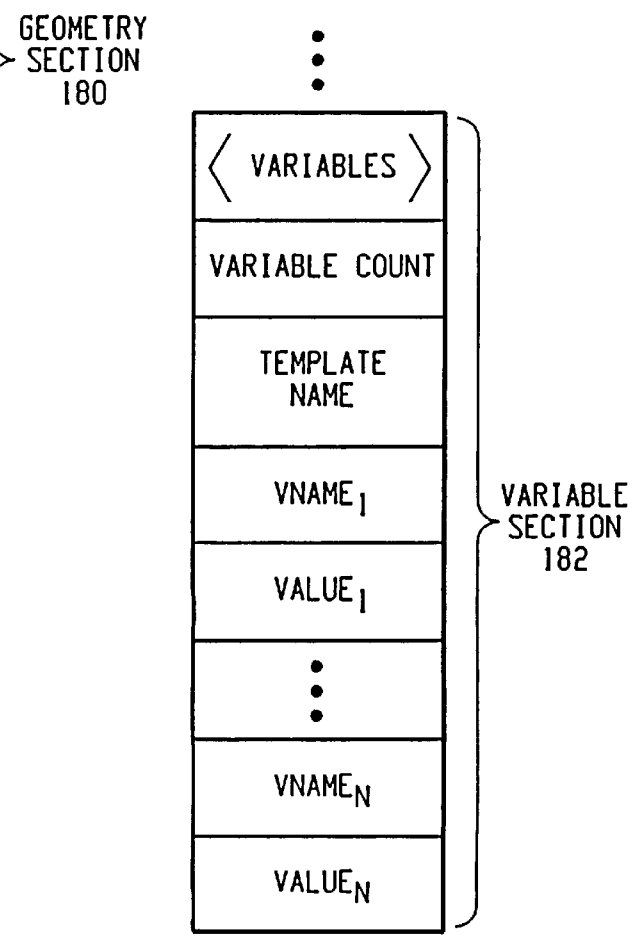

Referring now to FIG. 12, there is shown a variable section 182 comprised of a plurality of fields storing different variables. In this respect, variable section 182 includes "Variable Count," which refers to the number of variables in the variable section; "Template Name," which refers to the source template to be used with these variables (i.e., the stored set of macros used to generate the geometry); "VNames$_{1-N}$" and "Value$_{1-N}$" which respectively refer to the name of variables and the values associated with the named variables. This information is passed to a macro used for generating geometry.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A system for defining a manufacturing plan for producing a part, comprising:
 a user interface to select the part for producing from a plurality of available parts;
 a part data file to store basic part defining data associated with each of the available parts;
 a manufacturing file generator to generate a manufacturing file for the selected part based on the part data file and in accordance with predefined rules, the manufacturing file specifying part features of the selected part and machining processes for producing the part features;

an expert system to generate a manufacturing plan for producing the selected part based on the manufacturing file, the expert system generating the manufacturing plan in a neutral source code.

2. The system as recited in claim 1, further comprising a program code generator to convert the neutral source code to program code corresponding to the manufacturing plan, the program code being executable by at least one device controller, wherein the device controller provides signals to at least one machine tool to produce the selected part in accordance with the manufacturing plan.

3. The system as recited in claim 1, wherein the expert system specifies processing conditions associated with each machining process.

4. The system as recited in claim 1, wherein the predefined rules include rules specifying retrieval and/or derivation of additional part defining data associated with the selected part.

5. The system as recited in claim 1, wherein the expert system comprises a plurality of expert programs, and the manufacturing file further specifies a particular one of the expert programs which corresponds to each machining process.

6. The system as recited in claim 1, wherein the part data file comprises a plurality of part data files.

7. The system as recited in claim 1, wherein the predefined manufacturing rules include a decision table and/or an expert rule set.

8. An expert manufacturing system for producing a part, the system comprising:
    a user interface to select the part for producing from a plurality of available parts;
    a part data file to store basic part data associated with the selected part;
    a manufacturing file generator to generate a manufacturing file based on the part data file and in accordance with predefined rules, wherein the manufacturing file defines part features and identifies one or more machining operations for producing each respective part feature;
    an expert system to define a manufacturing plan for producing the selected part based on the manufacturing file, the manufacturing plan specifying machining operation sequences and process conditions associated with the one or more machining operations;
    a program code generator to generate executable program code corresponding to the manufacturing plan;
    one or more device controllers to execute the program code and provide a plurality of control signals based thereon; and
    one or more machine tools to carry out the one or more machining operations to produce the selected part in accordance with the manufacturing plan in response to the plurality of control signals.

9. The expert manufacturing system as recited in claim 8, wherein the part data file comprises a plurality of part data files.

10. The expert manufacturing system as recited in claim 8, wherein the part features include body elements, detail elements formed on the body elements, surface elements formed on the body elements and primitive geometry elements associated with the selected part.

11. The expert manufacturing system as recited in claim 8, wherein the expert system includes a plurality of expert programs, and the manufacturing file specifies the particular expert program of the plurality of expert programs to invoke to provide the process conditions for each identified machining operation.

12. The expert manufacturing system as recited in claim 8, further comprising a manufacturing simulator to generate a computerized simulation of the manufacturing plan for producing the selected part.

13. The expert manufacturing system as recited in claim 8, further comprising a drawing generator to generate a part drawing based on the manufacturing file.

14. The expert manufacturing system as recited in claim 8, wherein the predefined manufacturing rules include a decision table and/or an expert rule set.

15. The expert manufacturing system as recited in claim 8, wherein the predefined manufacturing rules include rules specifying retrieval and/or derivation of additional part data associated with the selected part.

16. The method as recited in claim 18, wherein generating the manufacturing file includes retrieving additional part data from an additional part data source in accordance with the predefined rules and deriving additional part data in accordance with the predefined rules.

17. The method as recited in claim 18, wherein the predefined rules include a decision table and/or an expert rule set.

18. A method for defining a manufacturing plan for producing a part, comprising:
    selecting the Dart for producing;
    obtaining basic part data associated with the part;
    generating a manufacturing file from the basic part data and in accordance with predefined rules, the manufacturing file including manufacturing data associated with the part, the manufacturing data defining body elements, detail elements formed on the body elements, surface elements formed on the body elements, primitive geometry elements, and machining operations to be carried out by one or more machine tools for producing the body elements, detail elements, surface elements, and/or primitive geometry elements;
    based on the manufacturing data, invoking one or more expert programs for generating a manufacturing plan for producing the part, the one or more expert programs providing machining conditions and machining sequences associated with the machining operations; and
    generating a neutral source code corresponding to the manufacturing plan.

19. The method as recited in claim 18, further comprising converting the neutral source code to program code corresponding to the manufacturing plan, the program code being executable by one or more machine controllers, the one or more machine controllers providing signals to the one or more machine tools to carry out the manufacturing plan for producing the part.

20. The method as recited in claim 18, wherein obtaining basic part data includes collecting the basic part data from a plurality of part data sources.

21. The method as recited in claim 18, further comprising generating a computer simulation which simulates the manufacturing plan for producing the part.

* * * * *